2,985,536
COMPOSITION OF MATTER COMPRISING A HIGH MOLECULAR WEIGHT POLYMER AND AN ACETAL OR KETAL OF A HYDROXYCARBOXYLIC ACID

Werner Stein and Willy Offermann, Dusseldorf-Holthausen, Germany, assignors to Dehydag, Deutsche Hydrierwerke G.m.b.H., Dusseldorf, Germany, a corporation of Germany No Drawing. Filed Mar. 27, 1957, Ser. No. 669,388

Claims priority, application Germany Mar. 27, 1956

(Filed under Rule 47(a) and 35 U.S.C. 116)

6 Claims. (Cl. 106—176)

This invention relates to plasticizers and gelatinizers for high polymers, and more particularly to the use of acetals or ketals of hydroxy-carboxylic acid esters for plasticizing and gelatinizing high polymers such as polyvinyl compounds, rubber, chlorinated rubber and the like.

We have found that acetals or ketals of hydroxy-carboxylic acid esters having structural formulas of the type.

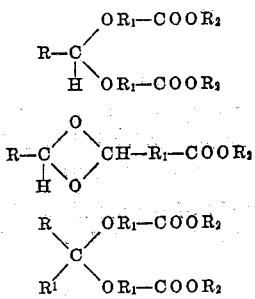

and

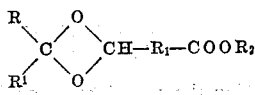

wherein R and $R^1$ are hydrogen, aliphatic, alicyclic, aromatic or fatty aromatic, $R_1$ is aliphatic, cycloaliphatic or aromatic, and $R_2$ is aliphatic, cycloaliphatic, aromatic or heterocyclic, are excellent plasticizers for high polymers. High polymer compositions compounded with such acetals or ketals as plasticizers are not only pliable at room temperature as well as considerably elevated temperatures, but also at extremely low temperatures. Moreover, the plasticizers in accordance with the present invention exhibit a very high resistance against extraction by solvents, oils and water from high polymer composition plasticized therewith. Finally, the acetals or ketals of hydroxy-carboxylic acid esters have a surprisingly strong stabilizing effect on halogenated high polymers, particularly at highly elevated temperatures, in that transparent films or foils produced with such halogenated polymers and which have the plasticizers in accordance with the invention incorporated therein do not discolor or lose any of the transparency upon exposure to such elevated temperatures.

The ketals or acetals of hydroxy-carboxylic acid esters used as plasticizers for high polymers in accordance with the present invention may be produced by a reaction between monohydroxy- or polyhydroxy-carboxylic acids, monovalent or polyvalent alcohols, and an aldehyde or ketone in an acid medium.

The monohydroxy- or polyhydroxy-carboxylic acid may be one of the aliphatic, alicyclic, aromatic or fatty aromatic series with one or more hydroxyl groups attached to the hydrocarbon radical. Typical examples of such hydroxycarboxylic acids are the following:

Glycolic acid
Lactic acid
Citric acid
Hydroxy-stearic acid
Di- and polyhydroxy fatty acids
Salicylic acid
p-Hydroxy-benzoic acid
Hydroxy-methyl-benzoic acid
Mandelic acid and the like.

The alcohols used in the production of the acetal- or ketal-carboxylic acid esters may be monohydroxy or polyhydroxy alcohols, especially alcohols with one to three hydroxyl groups in the molecule. The hydrocarbon radicals of these alcohols may be of the aliphatic, cycloaliphatic, aromatic or heterocyclic series. Moreover, the alcohols may carry substituent groups which are known to have a plasticizing effect on high polymers, such as tetrahydrofuran groups, phenol groups, ethyl groups, ester groups and so forth.

The aldehydes and ketones used for the formation of the acetal- or ketal-carboxylic acid esters may have from one to twenty carbon atoms in the molecule, but preferably from one to ten carbon atoms. Typical examples of such aldehydes and ketones are the following:

Formaldehydes
Acetaldehyde
Lauric aldehyde
Phenyl-acetaldehyde
Furfural
Tetrahydrofurfural
Benzaldehyde
Phenylethyl ketone
Acetophenone and the like.

The acetal- or ketal-carboxylic acid esters are preferably produced in a single step reaction, that is by simultaneously esterifying and acetalizing or ketalizing the hydroxy-carboxylic acid reaction compound. This simultaneous reaction may be brought about by reacting the hydroxy-carboxylic acid with an acetal or ketal preformed from the desired aldehyde and alcohol in accordance with well known methods (Fieser and Fieser, "Organic Chemistry," second edition, pages 216–217). In this simultaneous, single-step reaction the alcohol radicals of the acetal or ketal are split off and esterify the carboxy group of the hydroxy-carboxylic acid, while the remaining acetal or ketal radical attaches itself to the hydroxyl groups of the hydroxy-carboxylic acid to form the desired acetal- or ketal-hydroxy-carboxylic acid ester. However, as previously pointed out, the acetal- or ketal-hydroxy-carboxylic acid esters may also be produced by a reaction between the above-mentioned hydroxy-carboxylic acids, alcohols and aldehydes or ketones. In either case, the reaction mixture is heated to temperatures above 90° C. at which the water of condensation splits off. The reaction may be carried out at atmospheric as well as elevated pressure, and may be accelerated by the presence of esterification catalysts, such as hydrochloric acid, sulphuric acid, phosphoric acid, sodium acid sulphate, ammonium chloride, zinc chloride, ferric chloride, aluminum chloride, pyridine-hydrochloride, organic sulfonic acids, and so forth, which are well known and customarily used as condensation-promoting agents in the production of carboxylic acid esters.

The plasticizing and gelatinizing agents in accordance with the present invention are added to the high polymer in amounts ranging from 1 to 70% by weight, but preferably in amounts between 5 and 40% by weight, based on the weight of high polymer. Typical examples of high polymers which may be modified with the plasticizers of the present invention are the following: cellulose derivatives, polyvinyl and polyvinylene compounds including polyvinylesters such as polyvinyl chloride, polyacrylic acid derivatives, high-molecular polyamides or polyesters, rubber and such rubber derivatives as halogenated rubber, both synthetic and natural.

The plasticized high polymer compositions thus obtained may be shaped in customary fashion into threads, ribbons, films, foils, tubes, plates, blocks and the like, and may include other plasticizing diluents, stabilizing agents, fillers and color pigments customarily used in compounding plastic high polymer products.

The following examples will further illustrate the present invention and enable others skilled in the art to understand the invention more completely.

*Example I*

5 parts by weight of the acetal-carboxylic acid ester formed from di-hydroxy-stearic acid and formaldehyde dimethyl acetal having the structural formula

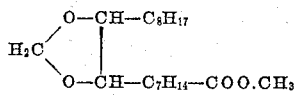

were incorporated into a nitrolacquer which consisted of 10 parts by weight nitrocellulose, 15 parts by weight ethyl acetate, 30 parts by weight butylacetate, 15 parts by weight butanol and 40 parts by weight toluene. The lacquer coatings produced with this lacquer composition resulted in a pliable, exceedingly light-and-cold resistant film.

*Example II*

40 parts by weight benzaldehyde acetal of lactic acid-2-ethyl-butanol ester having the structural formula

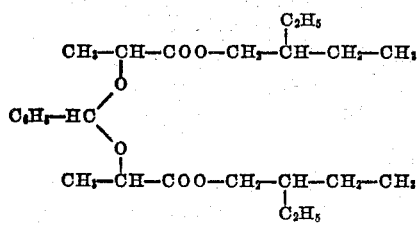

were homogenized with 60 parts by weight of emulsified polyvinyl chloride at 165° C. in a roller mill and thereafter drawn into a foil of 0.3 mm. thickness. The foil was still completely pliable and elastic at temperatures between —30 and —35° C. The plastic material thus obtained is very suitable for the production of foils for fancy accessories and apparel material and the like.

*Example III*

100 parts by weight polyvinyl chloride (K=80) were homogenized in a roller mill for 5 minutes at 170° C. with 25 parts by weight of the acetal carboxylic acid ester having the structural formula shown in Example II, produced from benzaldehyde-(2-ethyl-butanol)-acetal and lactic acid ethyl ester, and shaped into a film. The excellent stability and heat resistance of the resulting plastic material were illustrated by the fact that the initial light color and transparency remained completely unchanged at a temperature of 170° C. even after 60 minutes' exposure.

*Example IV*

100 parts by weight chlorinated rubber were dissolved in 600 parts by weight of a solvent mixture consisting primarily of aromatic hydrocarbons. Thereafter 25 parts by weight of the plasticizing material disclosed in Example III were added to the solution. The chlorinated rubber film remaining behind after evaporating the solvent mixture was soft, highly elastic and light-fast.

*Example V*

5 parts by weight of the cyclohexanone ketal of the di-hydroxy-stearic acid methyl ester of the formula

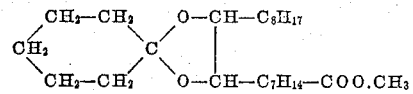

were used instead of the acetal ester of Example I. A valuable lacquer composition was obtained.

*Example VI*

5 parts by weight of the tetrahydrofurfural-acetal of the di-hydroxy-stearic acid methyl ester of the formula

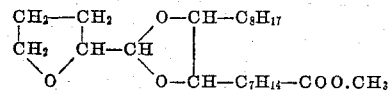

were used instead of the acetal ester of Example I. A well usable lacquer composition was obtained.

*Example VII*

40 parts by weight of the acetophenone ketal of lactic acid octyl ester having the structural formula

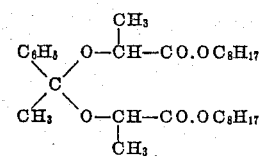

were substituted for the acetal ester of Example II. A plastic material for the production of foils was obtained.

*Example VIII*

40 parts by weight of the acetaldehyde acetal of lactic acid dodecyl ester of the structural formula

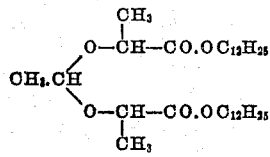

were substituted for the acetal ester of Example II. A valuable plastic material was obtained.

*Example IX*

5 parts by weight of the lauric aldehyde acetal of glycolic acid octyl ester of the formula

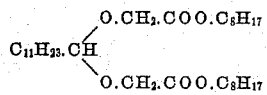

were used instead of the acetal ester of Example I. A good lacquer composition was obtained.

*Example X*

40 parts by weight of the acetaldehyde acetal of p-hydroxybenzoic acid decyl ester of the formula

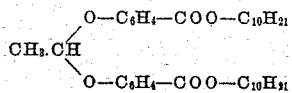

were substituted for the acetal ester of Example II. A good plastic material for the production of foils was obtained.

While we have disclosed certain specific embodiments of the present invention, it will be apparent to those skilled in the art that the invention is not limited to these embodiments, and that various changes and modification may be made without departing from the spirit of the invention or the scope of the appended claims.

We claim:
1. A composition of matter comprising a nitrocellulose lacquer base and from 1 to 70% by weight of the acetal-stearic acid methyl ester formed from dihydroxystearic acid and formaldehyde-dimethylacetal, based on the weight of nitrocellulose base.
2. A composition of matter comprising polyvinylchloride and from 1 to 70% by weight of the benzaldehyde acetal of lactic acid-2-ethyl-butanol ester, based on the weight of polyvinyl-chloride.
3. A composition of matter comprising chlorinated rubber and from 1 to 70% by weight of the benzaldehyde acetal of lactic acid-2-ethyl-butanol ester, based on the weight of chlorinated rubber.
4. A composition of matter comprising polyvinyl chloride and from 1 to 70% by weight of the formaldehyde acetal of methyl dihydroxystearate.
5. A composition of matter comprising polyvinyl chloride and from 1 to 70% by weight of the acetaldehyde acetal of decyl p-hydroxybenzoate.
6. A composition of matter comprising a high molecular weight polymer selected from the group consisting of polyvinyl chloride, chlorinated rubber and nitrocellulose and, as a plasticizer, from 1 to 70% by weight of a compound selected from the group consisting of acetals of hydroxycarboxylic acid esters and ketals of hydroxycarboxylic acid esters, said compound having a structural formula selected from the group consisting of

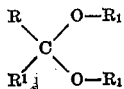

and

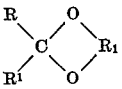

wherein R is selected from the group consisting of hydrogen, aliphatic hydrocarbon radicals having 1 to 11 carbon atoms, phenyl radicals, tetrahydrofuryl, furyl and benzyl radicals; $R^1$ is selected from the group consisting of hydrogen, methyl, ethyl, and together with R a pentamethylene bridge and $R_1$ represents a residue from a hydroxycarboxylic acid ester, said hydroxycarboxylic acid moiety of said hydroxycarboxylic acid ester being selected from the group consisting of glycolic acid, lactic acid, citric acid, dihydroxystearic acid, hydroxystearic acid, salicylic acid, p-hydroxy-benozic acid, hydroxymethyl-benzoic acid, mandelic acid and said alcohol moiety of said hydroxycarboxylic acid ester being selected from the group consisting of aliphatic hydrocarbon radicals having 1 to 12 carbon atoms; said compound having from 20 to 36 carbon atoms.

References Cited in the file of this patent
UNITED STATES PATENTS

| | | |
|---|---|---|
| 2,815,351 | Stansbury et al. | Dec. 3, 1957 |
| 2,820,813 | Smith | Jan. 21, 1958 |